Patented Nov. 16, 1926.

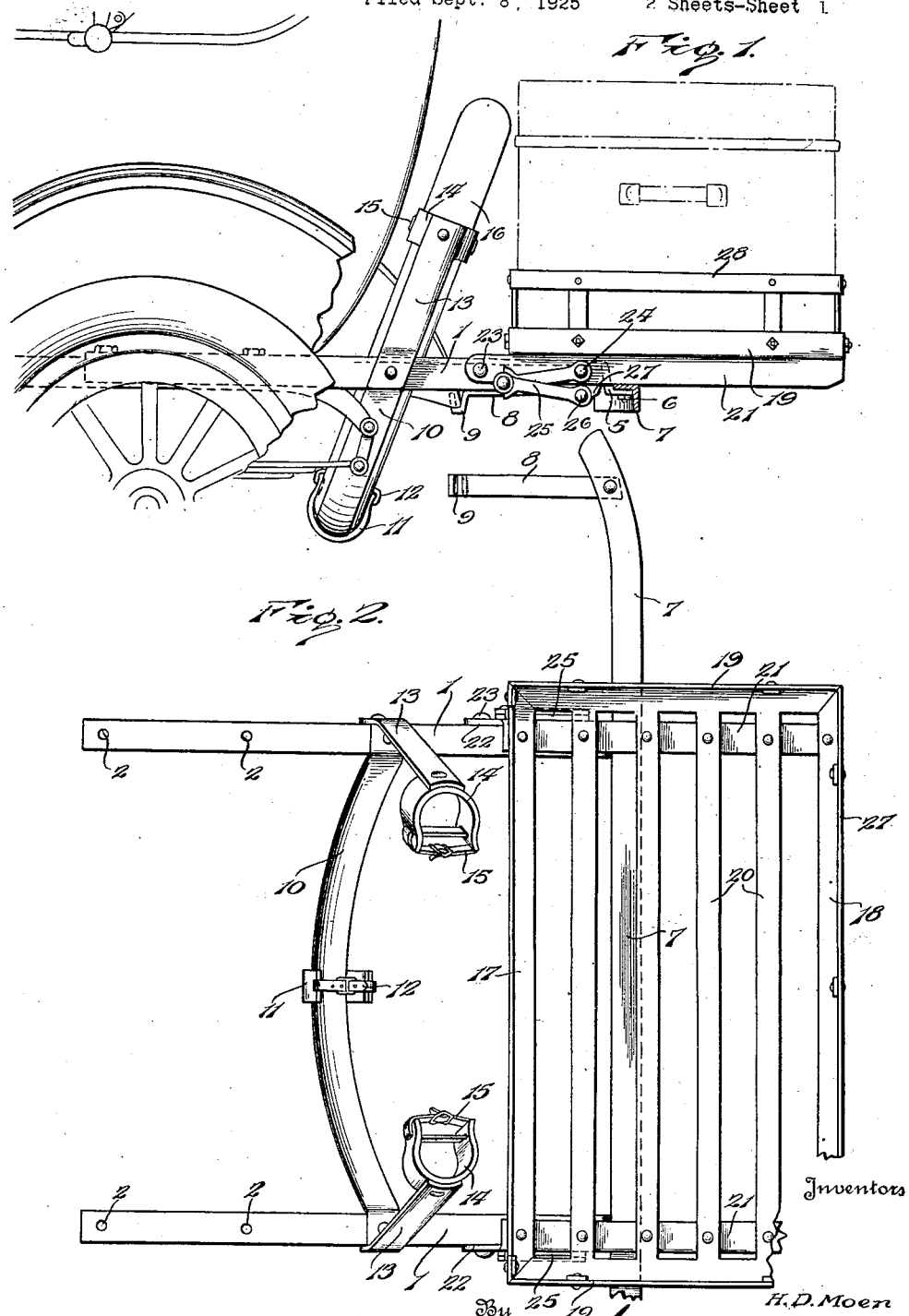

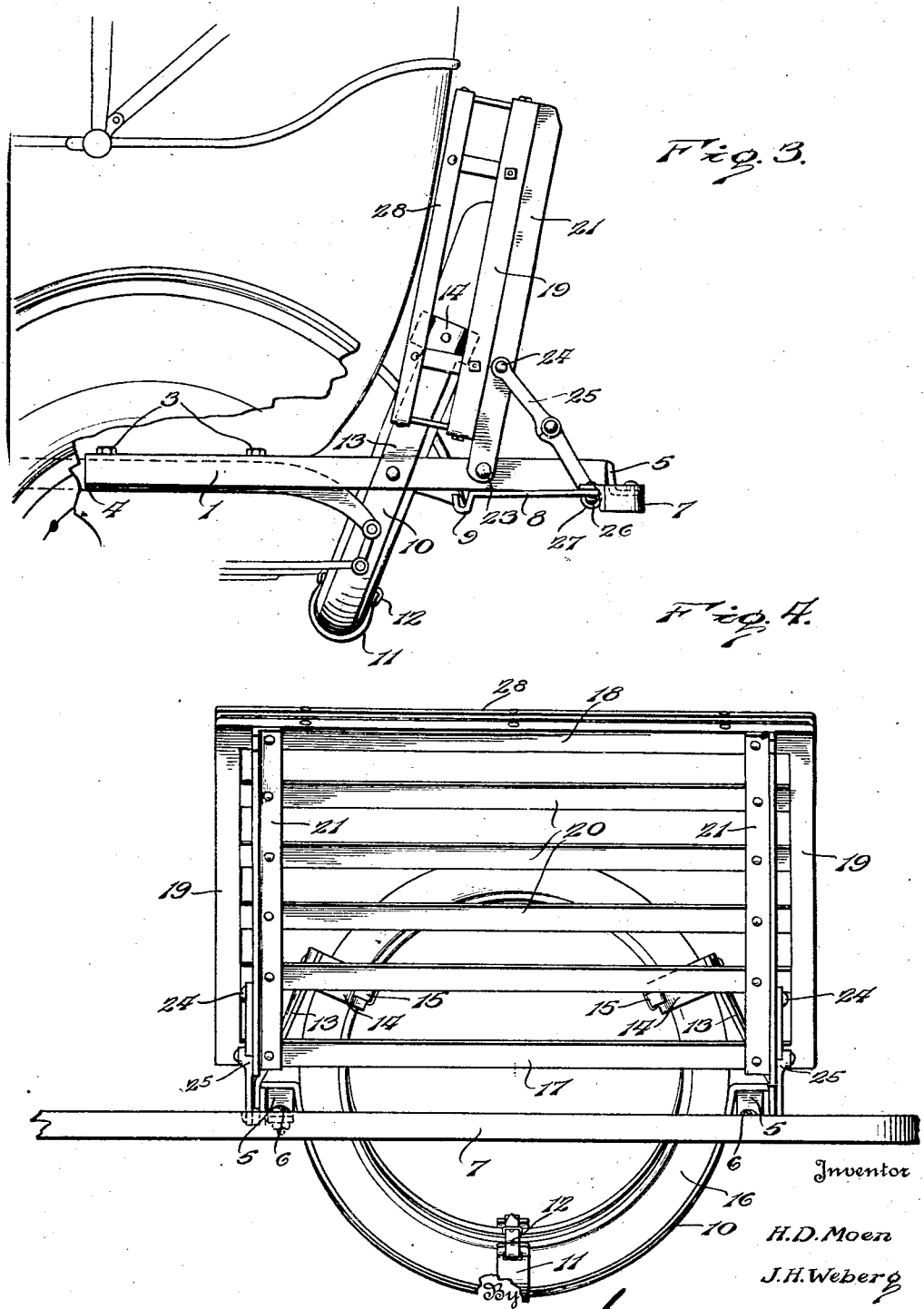

1,606,954

UNITED STATES PATENT OFFICE.

HELMER D. MOEN AND JOHN H. WEBERG, OF INWOOD, IOWA.

LUGGAGE CARRIER.

Application filed September 8, 1925. Serial No. 55,089.

This invention relates to a luggage carrier and one object of the invention is to provide a luggage carrier adapted to be mounted at the rear of an automobile and which serves as the dual purpose of a rack for carrying a trunk or other luggage and also as a carrier for a spare tire as well as a rear bumper.

Another object of the invention is to so form the frame portion of the carrier that the side bars thereof may be braced intermediate their ends by the spare tire carrier.

Another object of the invention is to so mount the luggage receptacle of the carrier that it may be swung vertically from an elevated inoperative position to a lowered position for use in which latter position it rests upon the side bars and bumper forming cross bar of the vehicle engaging frame.

Another object of the invention is to so form the luggage receptacle that, when moved upwardly and secured in inoperative position, it will be disposed close to the back of the vehicle body in overhanging relation to the rearwardly projecting portion of a tire supported in the tire carrier.

The invention is illustrated in the accompanying drawings, wherein—

Figure 1 is a view in side elevation showing the luggage carrier mounted upon an automobile with its luggage receptacle in an operative position;

Fig. 2 is a top plan view of the luggage carrier;

Fig. 3 is a view similar to Fig. 1 with the luggage receptacle shown in an elevated inoperative position, and Fig. 4 is a view showing the luggage carrier in rear elevation.

The side bars 1 of the frame portion of the luggage carrier are preferably formed of angle metal and have their upper flanges provided with openings 2 adjacent their forward ends to receive the bolts 3 which pass through the chassis bars 4 of the automobile and firmly hold the frame in engagement with the chassis bars. The depending outer side flanges of the side bars terminate in spaced relation to the rear ends of the horizontal flanges and the extended rear end portions of the horizontal flanges form tongues 5 which are bent downwardly and then rearwardly and secured by bolts 6 to the cross bar 7, which cross bar has its end portions extended outwardly beyond the side bars of the frame and serves not only as a cross bar at the rear end of the frame but also as a bumper for the automobile. Strips 8 are secured to the cross bar 7 adjacent its ends and extend forwardly therefrom and terminate in hooks 9 to engage the rear mud guards of the automobile and brace the frame against upward movement. In order to brace the side bars intermediate their ends, a yoke 10 is disposed between the side bars and secured at its ends to the side bars by rivets or other suitable fasteners. The yoke is bowed downwardly, as shown in Figs. 1 and 3, and is curved transversely and intermediate its length carries a clamp 11, the arms of which project upwardly and are formed with openings to receive a strap 12. Strips 13 extend upwardly from the side bars at the ends of the yoke 10 in converging relation to each other, as shown in Figs. 2 and 4, and at their upper free ends carry clamps 14 which are similar to the clamp 11 and have their arms facing inwardly and formed with openings to receive the straps 15. It will, therefore, be seen that the yoke 10 together with the strips 13 and clamps 11 and 14 will constitute a carrier for a spare tire. The spare tire 16 when put in place is secured by the straps 15 and since the yoke and cooperating strips 13 are disposed at an incline longitudinally of the supporting frame the tire will be disposed at the rear of the automobile, as shown in Figs. 1 and 3.

The receptacle which receives the trunk or other luggage is formed as a basket having front and rear walls 17 and 18 and side walls 19. Slats 20 which form an open bottom for the receptacle extend between the side walls 19 and are secured to mounting bars 21 which are secured at their front and rear ends against the under faces of the front and rear walls 17 and 18. The mounting bars are formed of angle metal and have their depending outer side flanges extended forwardly beyond the forward ends of their horizontal flanges to form ears 22 through which bolts 23 pass to pivotally connect the receptacle with the side bars 1 of the supporting frame. Additional openings are formed in the depending side flanges of the mounting bars in spaced relation to the openings through which the bolts 23 pass, these openings being adapted to receive fasteners 24 by means of which the break-joint braces or supporting links 25 are pivotally connected with the receptacle. The other ends of the braces are pivotally secured to the ears 26 which extend downwardly from the side flanges of the bars by fasteners 27 and it will be readily understood that these braces support the receptacle when swung upwardly to the inoperative position shown in Fig. 3. Referring to this figure, it will be seen that the braces 25 extend downwardly at a rearward incline from the raised receptacle and since they are prevented from folding outwardly they will support the receptacle in a very efficient manner. When in the elevated position, the receptacle encases the upper portion of a tire carried by the tire carrier and will serve to protect the tire. It should be further noted that the receptacle may be locked in any desired manner after being raised and when so locked will serve to prevent unauthorized removal of the tire. A rail 28 extends along the ends of the receptacle and rear side thereof so that the walls 18 and 19 will extend upwardly a sufficient distance to securely hold a trunk in the receptacle. A rail has not been provided along the front wall as it would strike the strips 13 of the spare tire carrier and prevent the receptacle from being swung upwardly to the inoperative position.

Having thus described the invention, we claim:

1. A carrier comprising a frame including side bars having their forward end portions adapted for connection with the rear portions of the chassis bars of a vehicle, a tire carrier extending between and secured to said side bars intermediate their ends and serving to hold the side bars in spaced relation to each other, a bumper bar secured to the rear ends of said side bars, means for connecting said bumper bar with the rear mud guards of a vehicle to brace the bumper bar and side bars against upward movement, and a receptacle carried by said frame to the rear of said tire carrier and adapted to rest upon the bumper bar.

2. A carrier comprising a frame including side bars having their forward end portions adapted for connection with the chassis bars of a vehicle, a tire carrier extending between and secured to said side bars intermediate their ends and serving to hold the side bars in spaced relation to each other, a bumper bar secured to said side bars with its end portions extending outwardly beyond the same, and a receptacle of greater width than said frame and including mounting bars extending across the under face of its bottom and forwardly beyond the same with their forward ends pivotally connected with said side bars to the rear of said tire carrier to mount the receptacle for swinging movement from a raised inoperative position in overhanging relation to the tire carrier to a lowered operative position upon the bumper bar and rear end portions of said side bars, and releasable means to support said receptacle in a raised position.

3. A carrier comprising a frame including side bars having their forward end portions adapted for connection with the rear portions of the chassis bars of a vehicle, a tire carrier extending between and secured to said side bars intermediate their ends and serving to hold the side bars in spaced relation to each other, a bumper bar secured to the rear ends of said side bars with its end portions extending outwardly beyond the same, means for connecting the end portions of said bumper bar with the rear mud guards of a vehicle, a receptacle of greater width than said frame and including mounting bars extending across the under face of its bottom and forwardly beyond the same with their forward ends pivotally connected with said side bars between said tire carrier and said bumper to mount the receptacle for swinging movement from a raised position in overhanging relation to the tire carrier to a lowered position to rest upon the bumper bar and rear end portions of said side bars, braces of a length to extend diagonally between said mounting bars of the rear ends of said side bars when said receptacle is in a raised position, and fasteners pivotally connecting said braces with said mounting bars and side bars.

4. A carrier comprising a frame adapted to be disposed at the rear of a vehicle and including side bars having their forward end portions adapted for connection with the chassis bars of the vehicle, a cross bar secured to the rear ends of said side bars and having its end portions extending outwardly beyond the side bars, said cross bar constituting a bumper bar, and a receptacle resting upon the cross bar and side bars of said frame and extending rearwardly beyond the same when in an operative position, said receptacle including mounting bars extended forwardly and pivotally connected with said side bars in spaced relation to their rear ends to mount the receptacle for vertical swinging movement from a lowered operative position to a raised inoperative position.

5. A carrier comprising a frame adapted to be disposed at the rear of a vehicle and including side bars extending longitudinally of the vehicle and adapted for connection with the chassis bars of the vehicle and at their rear ends provided with tongues spaced below the plane of the upper faces of the side bars, a cross bar secured to said tongues and extending outwardly beyond the side bars, and a receptacle including mounting bars disposed longitudinally thereof and having horizontal flanges secured to the bottom of the receptacle and vertical flanges extended forwardly of the horizontal flanges and pivotally connected with the side bars of said frame against the outer side faces thereof and extending across the upper face of said cross bar when said receptacle is swung downwardly from a raised inoperative position to a lowered operative position.

6. A carrier comprising a frame adapted to be secured to a portion of a vehicle and extend rearwardly therefrom, said frame including a transverse bracing element intermediate its length and constituting a tire carrier and a cross bar at its rear end constituting a bumper bar, and a luggage receptacle pivotally connected with said frame for vertical swinging movement from a raised inoperative position in overhanging relation to the tire carrier to a lowered operative position, said receptacle when lowered resting upon the side bars and cross bar of said frame.

7. A carrier comprising a frame adapted to be secured to a portion of a vehicle and extend rearwardly therefrom, said frame including side bars formed of angle material having horizontal flanges to engage the upper faces of the chassis bars of a vehicle and depending outer side flanges to engage the outer side faces of the chassis bars, said upper flanges being extended beyond the rear ends of the side flanges and bent downwardly at the rear ends of the side flanges and then outwardly to form rearwardly extending tongues, a cross bar secured upon said tongues with its end portions extending beyond the side bars, and a luggage receptacle including a body, mounting bars extending across said body adjacent its sides and secured against its bottom, each of said mounting bars being formed of angle material having an upper flange secured to said body and a depending outer side flange extending forwardly beyond its upper flange and pivotally secured against the outer face of the side flange of a side bar of said frame and adapted to rest upon said cross bar.

8. A carrier comprising a frame including side bars having their forward portions adapted for connection with the chassis bars of a vehicle, a tire carrier extending between and secured to said side bars intermediate their ends and serving to hold the side bars in spaced relation to each other, and a luggage receptacle carried by said frame to the rear of said tire carrier and pivotally mounted for swinging movement from a raised position in overhanging relation to the tire carrier to a lowered position resting upon the side bars.

In testimony whereof we affix our signatures.

HELMER D. MOEN. [L. S.]
JOHN H. WEBERG. [L. S.]